United States Patent [19]

Bergstrom et al.

[11] Patent Number: 5,210,168
[45] Date of Patent: May 11, 1993

[54] PROCESS FOR FORMING SILOXANE BONDS

[75] Inventors: Debora F. Bergstrom; Binh T. Nguyen; John L. Speier; Ming-Shin Tzuo, all of Midland, Mich.

[73] Assignee: Dow Corning Corporation, Midland, Mich.

[21] Appl. No.: 862,026

[22] Filed: Apr. 2, 1992

[51] Int. Cl.$^5$ ............................................. C08G 77/06
[52] U.S. Cl. ........................................ 528/12; 528/15; 528/16; 528/18; 528/21; 528/23; 528/26; 556/450; 556/451; 556/470
[58] Field of Search ...................... 528/26, 12, 15, 18, 528/16, 21, 23; 556/450, 451, 470

[56] References Cited

U.S. PATENT DOCUMENTS 2,486,992  8/1949  Sowg ................................. 260/448.2
2,490,691  12/1949  Kamneier ......................... 260/448.8
3,615,272  10/1971  Frye et al. ........................ 260/46.5
4,950,779  8/1990  Wengrovius et al. .
5,010,159  4/1991  Bank et al. ............................. 528/23

FOREIGN PATENT DOCUMENTS 895650  11/1953  Fed. Rep. of Germany .

OTHER PUBLICATIONS

Noll, Chemistry and Technology of Silicomes, Academic Press, p. 190.
Leznou et al., Polydiethylsiloxane Liquids J. Gen Chem, 29 (1959) 1482.

Primary Examiner—Melvyn I. Marquis
Attorney, Agent, or Firm—Roger E. Gobbrogge

[57] ABSTRACT

The present invention relates to a novel method of preparing siloxane bonds. The method comprises reacting less than or equal to 1 equivalent of a carboxylic acid with 2 equivalents of alkoxy groups on an alkoxysilane in the presence of a strong acid.

10 Claims, No Drawings

PROCESS FOR FORMING SILOXANE BONDS

BACKGROUND

This invention relates to a novel method of forming siloxane bonds by mixing carboxylic acids with alkoxysilanes in the presence of catalytic amounts of strong acids.

It is well known in the art that when alkoxysilanes are hydrolyzed they first form silanols which can then condense to form siloxanes (see, eg., Noll: Chemistry and Technology of Silicones, Second Edition, Academic Press. NY (1968)). As described in this reference, one of the more common methods of hydrolyzing alkoxysilanes involves merely mixing the alkoxysilanes with water.

Noll suora, Sowa in U.S. Pat. No. 2,486,992 and Leznov et al. in J. Gen. Chem USSR. Vol 29, p. 1482 (1959) also describe conversion of organoalkoxysilanes into silanols by reaction with organic acids and a hydrogen ion source. The resultant silanols are thought to later condense to form siloxanes These references teach that 1 equivalent of organic acid is required for each equivalent of alkoxy group.

Langkammerer in U.S. Pat. No. 2,490,691 teaches the polymerization of tetraalkylsilicates to form alkylpolysilicates. The process described therein comprises mixing the tetraalkylsilicates with carboxylic acids at elevated temperatures. This process provides high molecular weight polymeric esters of polysilicic acid which are liquid and soluble in organic solvents.

Bayer in GB Patent 722,441 describes a process of producing siloxane bonds by hydrolyzing halosilanes. The process described therein comprises reacting an organohalosilane with a carboxylic acid and a compound containing an alcoholic or phenolic hydroxyl group.

Various method of hydrolyzing trichlorosilanes are likewise described in the art. For instance, U.S. Pat. Nos. 3,615,272 and 5,010,159 granted to Frye et al. and Bank et al. respectively describe processes for forming hydrogen silsesquioxane polymers in which trichlorosilane is hydrolyzed in a medium comprising sulfuric acid and an aromatic hydrocarbon. The resultant product is isolated by either washing the reaction mixture with water and sulfuric acid or by neutralization with a mild base.

Therefore, what has not been described in the prior art and has now been discovered is that an extremely wide variety of alkoxysilanes can be converted to siloxanes using ½ equivalent of carboxylic acid for each siloxane bond formed.

SUMMARY OF THE INVENTION

This invention relates to a method of forming siloxane bonds. The method comprises mixing ingredients comprising less than or equal to about 1 equivalent of a carboxylic acid with 2 equivalents of alkoxy groups on an alkoxysilane of the structure $R_nSi(OR')_{(4-n)}$ in the presence of a strong acid catalyst. In the above formulas each R is independently selected from the group consisting of hydrogen and substituted or unsubstituted alkyl, alkenyl, and aryl groups. R' is a substituted or unsubstituted aliphatic group and n is 1, 2, or 3.

DETAILED DESCRIPTION OF THE INVENTION

The present invention is based on the unexpected discovery that carboxylic acids and alkoxysilanes in the presence of catalytic amounts of strong acids react nearly quantitatively according to the stoichiometry described by the equation:

in which R' is a substituted or unsubstituted aliphatic group and R" is selected from the group consisting of hydrogen and substituted or unsubstituted alkyl and aryl groups. This was particularly unexpected since the prior art teaches that one equivalent of acid is necessary for each equivalent of alkoxy group.

The alkoxysilanes useful in the present invention have the general formula $R_nSi(OR')_{(4-n)}$. R in this formula may be independently selected from hydrogen and substituted or unsubstituted alkyl, alkenyl, or aryl groups of 1-20 carbon atoms. Examples of R groups include hydrogen, methyl, ethyl, vinyl, propyl, butyl, pentyl, hexyl, phenyl and the like. Especially preferred are hydrogen, hydrocarbons with 1-6 carbon atoms, and phenyl. R' in this formula is a substituted or unsubstituted aliphatic group. Examples of R' groups include methyl, ethyl, propyl, butyl, hydroxyethyl, etc. Especially preferred R' groups are alkyl radicals with 1-6 carbon atoms. The most preferred R' groups are methyl and ethyl. One skilled in the art would also recognize that alkoxysilanes with mixtures of R and R' groups as well as mixtures of various alkoxysilanes may be used herein.

Representative examples of alkoxysilanes useful in this invention include trimethoxysilane, triethoxysilane, methyltrimethoxysilane, phenyltriethoxysilane, dimethyldimethoxysilane, phenylmethyldimethoxysilane, methyldimethoxysilane, isobutyltrimethoxysilane, dimethyldi-n-hexoxysilane and trimethylmethoxysilane.

The above alkoxysilanes are well known in the art and can be prepared by known techniques. In addition, the alkoxysilanes can be formed by mixing compounds of the formula R'OH with halosilanes of the structure $R_nSiCl_{4-n}$ in the presence of an acid, wherein R' is as defined above. When this is done near room temperature or above, the compound of the formula ROH rapidly reacts with the halosilane to form an alkoxysilane with the liberation of HCl as a gas. As set forth above, 1 equivalent of a carboxylic acid can then react with 2 equivalents of the alkoxysilane to form a siloxane bond, one equivalent of an ester and one equivalent of a compound of the structure R'OH. The resultant equivalent of R'OH compound can then react with additional halosilanes to initiate the formation of additional alkoxysilanes.

The carboxylic acids useful herein generally comprise those having the general structure R"COOH or R'''(COOH)$_2$, wherein R" comprises hydrogen or a substituted or unsubstituted alkyl, alkenyl or aryl group and R" comprises a substituted or unsubstituted alkyl, alkenyl or aryl group. Examples of such R" groups include hydrogen, methyl, ethyl, butyl, butenyl phenyl, etc. Examples of R''' groups include methylene, ethylene, phenylene, etc. Obviously, mixtures of acids may also be used herein. Representative examples of suitable acids include formic, acetic, butyric, benzoic, oxalic, adipic, phthalic, maleic, lactic, glycolic, etc. Especially preferred herein is the use of acetic acid.

The above alkoxysilanes and acids react when they are mixed in an appropriate vessel. Solvents such as ethers or aromatic hydrocarbons may be used if desired. Ratios of less than or equal to about 0.5 equivalent of acid per equivalent of alkoxy group are used herein. When about 0.5 equivalent of acid per equivalent of alkoxy group is used, the alkoxysilanes are nearly fully polymerized. When less than this acid ratio is used, polymers with residual alkoxy groups are produced.

The above reaction can be conducted at a temperature in the range of from about room temperature up to about 200° C. and for a time sufficient to polymerize the alkoxysilanes.

The reaction may also be conducted in any desired environment such as air, nitrogen, argon, etc. and under any desired pressure. For convenience, however, it is generally preferred to conduct the reaction in air at atmospheric pressure.

The above reaction is generally catalyzed by the addition of a strong acid. Examples of suitable catalysts include hydrogen chloride, sulfuric acid, nitric acid, a chlorosilane, ferric chloride, or aluminum chloride. Generally the catalysts are added to the mixture in catalytic amounts (eg., 0.01–0.0001 moles).

As set forth above, the products are siloxanes which may contain Si—OR in various units of the polymer. Polysiloxanes may be maintained in the ROH and R'COOR co-products or solvents may be added to dissolve the products. Examples of suitable solvents include alkanes ethers, higher alcohols, aromatic hydrocarbons. etc.

The following nonlimiting examples are provided so that one skilled in the art may more fully understand the invention.

EXAMPLE 1

Diphenyldimethoxysilane (86 g. 0.34 mole) in toluene (54.5 g) and acetic acid (25.9 g. 0.35 mole) acidified with a small amount of HCl gas was heated to 90–95° C. for 2.5 hours in a 500 mL flask equipped with a cold finger condenser. After about 1 hour methyl acetate (b.p. 57° C.) and methanol (b.p. 64° C.) began refluxing. On cooling to room temperature crystals of $(Ph_2SiO)_3$ precipitated from the solution. Toluene, methyl acetate and methanol were removed under vacuum leaving 71 g of crystalline solids, analyzed by supercritical fluid chromatography as 53% $(Ph_2SiO)_3$, 8% $(Ph_2SiO)_4$ and 39% unidentified siloxanes.

EXAMPLE 2

Methanol (32.6 g. 1.02 mole) was pumped at a rate of 5 mL/min into diphenyldichlorosilane (128.9 g, 0.51 mole) kept at 65–70° C. in a 500 mL flask equipped with a cold finger condenser. The mixture was heated for 1 hour until HCl gas was no longer evolved. Acetic acid (30 g. 0.51 mole) was then pumped into the flask. When the acetic acid was added crystalline solids precipitated. The crystals were filtered at room temperature from the mixture and found to be 55 g of 98% pure $(Ph_2SiO)_3$ (Ph=phenyl). The filtrate contained 20 g of 95% pure $(Ph_2SiO)_4$.

EXAMPLE 3

Dimethyldimethoxysilane (14.01 mL 0.1 mole). acetic acid (5.72 mL, 0.1 mole), ethylbenzene (2 mL)(as an internal standard for GC analysis), and sulfuric acid (27 microliters, 0.0005 mole) were mixed together in a glass tube and placed in a water bath at 25° C. Samples were periodically analyzed by GC. The areas of the compounds were divided by the area of the ethylbenzene so that the rate of disappearance of reagents and identity and rate of appearance of the products could be plotted versus time. In 135 minutes, 0.1 mole of methanol and 0.1 mole of methyl acetate had appeared and dimethyldimethoxysilane and acetic acid were not detectable.

EXAMPLE 4

Trimethoxysilane (containing 1 mole % $HSi(OCH_3)_2Cl$) was mixed with glacial acetic acid in mole ratios of 1/1, 1/1.1, 1/1.2, 1/1.3, 1/1.4 and 1/1.5 at room temperature. GC analysis of each mixture after 24 hours showed the appearance of methanol and methyl acetate in the mole ratio of 1/1. At the silane/acid ratio of 1/1.1 the mixtures formed a viscous solution. At 1/1.2 a very soft viscous gel began to form. At 1/1.5 the polymer precipitated as solid $HSiO_{3/2}$.

EXAMPLE 5

The experiment of Example 4 was repeated with a silane/acid ratio of 1/1.5 without the dimethoxychlorosilane. No methanol or methyl acetate formed in 24 hours, but the trimethoxysilane had disproportionated to form silane and tetramethoxysilane.

EXAMPLE 6

Dimethyldimethoxysilane (10.021 mL. 0.084 mole) containing dimethyldichlorosilane (0.13 g. 0.001 mole) was mixed with acetic acid (3.35 g. 0.056 mole) at room temperature. After 23 hours GC analysis indicated methanol and methyl acetate in a mole ratio of 1/1, $CH_3O[(CH_3)_2SiO]_xOCH_3$, x=2, 3, and 4, and small amounts of $CH_3O[(CH_3)_2SiO]_xOAc$, x=2, 3, and 4 (Ac=acetate). After 96 hours, GC/MS showed no acetic acid, no AcOSi, and GPC showed $CH_3O[(CH_3)_2SiO]_xCH_3$ with an average molecular weight of 2200. $^{29}SiNMR$ analysis after 123 hours showed the presence of linear siloxanes containing small amounts of $[(CH_3)_2SiO]_x$, x=4, 5, 6 and 7.

EXAMPLE 7

Example 6 was repeated with 2.99 mole % dimethyldichlorosilane as a catalyst and 10% by weight decane as an internal standard for GC analysis. The solution was analyzed by GC every 2 hours. After about 13 hours the reaction was complete and the mole ratio of methanol/methyl acetate was 1/1.

EXAMPLE 8

Glacial acetic acid (3.42 g. 0.057 mole) and trimethoxysilane (4.64 g, 0.038 mole) were mixed in a vessel and stirred for about 1.5 hours without reaction. Five microliters of trichlorosilane was then added to the mixture. The mixture was stirred for about 76 hours at room temperature, heated to 63° C. over 30 minutes and maintained at this temperature for 3 hours and 10 minutes. NMR was performed on the mixture and it showed that no trimethoxysilane remained.

A sample of the mixture was applied to a silicon wafer and the wafer was spun at 3000 rpm for 10 seconds. A high quality film of $HSiO_{3/2}$ 10,000 angstroms thick resulted. FTIR of the film showed the presence of a strong Si-H absorption at 2244 $cm^{-1}$.

EXAMPLE 9

A mixture of methanol (16.7 g. 0.46 mole) and acetic acid (27.6 g. 0.46 mole) was dripped from an addition funnel into refluxing trimethylchlorosilane (56° C.)(100 g, 0.92 mole). As the addition proceeded the temperature of reflux rose to 80° C. After about 1 hour the mixture was cooled. The resultant mixture weighed 108 g, indicating that 33.6 g of HCl had been driven from the mixture (equivalent to theory).

GC analysis of the mixture indicated 28 area percent methyl acetate, 70.1 area percent hexamethyldisiloxane and a trace of unidentified impurity.

That which is claimed is:

1. A method of forming siloxane bonds from a carboxylic acid and an alkoxysilane comprising mixing ingredients comprising less than or equal to about one equivalent of a carboxylic acid with 2 equivalents of alkoxy groups on an alkoxysilane of the structure $R_nSi(OR')_{(4-n)}$ in the presence of a catalytic amount of a strong acid, wherein each R is independently selected from the group consisting of hydrogen and substituted or unsubstituted alkyl, alkenyl, and aryl groups, R' is a substituted or unsubstituted aliphatic group and n is 1, 2, or 3.

2. The method of claim 1 wherein R is independently selected from the group consisting of hydrogen and substituted or unsubstituted alkyl groups containing 1-6 carbon atoms.

3. The method of claim 1 wherein R' is independently selected from the group consisting of substituted and unsubstituted alkyl groups containing 1-6 carbon atoms.

4. The method of claim 1 wherein the carboxylic acid is selected from the group consisting of R"COOH and R'"(COOH)$_2$, wherein R" comprises hydrogen or a substituted or unsubstituted alkyl, alkenyl or aryl group and R'" comprises a substituted or unsubstituted alkyl, alkenyl or aryl group.

5. The method of claim 1 wherein the carboxylic acid is acetic acid.

6. The method of claim 1 wherein the ingredients are mixed in the presence of a solvent.

7. The method of claim 1 wherein the ingredients are mixed at a temperature in the range of from about room temperature up to about 200° C.

8. The method of claim 1 wherein the ingredients are mixed under an environment selected from the group consisting of air, nitrogen and argon.

9. The method of claim 1 wherein the strong acid is selected from the group consisting of hydrogen chloride, sulfuric acid, nitric acid, a chlorosilane, ferric chloride, and aluminum chloride.

10. A method of forming a siloxane resin having units of the structure $HSi(OR')_yO_{(3-y)/2}$ from a carboxylic acid and an alkoxysilane comprising mixing ingredients comprising less than or equal to about one equivalent of a carboxylic acid with 2 equivalents of alkoxy groups on an alkoxysilane of the structure $HSi(OR')_3$ in the presence of a catalytic amount of a strong acid, wherein R' is a substituted or unsubstituted aliphatic group and y is 0, 1 or 2.

* * * * *